United States Patent [19]

Tobita et al.

[11] Patent Number: 4,972,716
[45] Date of Patent: Nov. 27, 1990

[54] SEMICONDUCTOR PRESSURE CONVERTING DEVICE

[75] Inventors: Tomoyuki Tobita; Akira Sase, both of Katsuta; Yoshimi Yamamoto, Naka; Satoshi Shimada, Hitachi, all of Japan

[73] Assignee: Hitachi, Ltd., Tokyo, Japan

[21] Appl. No.: 392,298

[22] Filed: Aug. 11, 1989

[30] Foreign Application Priority Data

Aug. 31, 1988 [JP] Japan .................................. 63-214985

[51] Int. Cl.$^5$ ............................ G01L 7/08; G01L 9/06
[52] U.S. Cl. ........................................ 73/721; 73/727; 338/4
[58] Field of Search ............ 73/708, 721, 727, DIG. 4, 73/706; 338/4

[56] References Cited

U.S. PATENT DOCUMENTS

| | | | |
|---|---|---|---|
| 4,321,578 | 3/1982 | Nagasu et al. | 73/721 |
| 4,574,640 | 3/1986 | Krechmery | 73/721 |
| 4,852,408 | 8/1989 | Sanders | 73/727 |

*Primary Examiner*—Donald O. Woodiel
*Attorney, Agent, or Firm*—Antonelli, Terry, Stout & Kraus

[57] ABSTRACT

A semiconductor pressure converting device including a fixing table joined to a silicon diaphragm consists of 2 structures superposed on each other, in which the longitudinal elastic modulus of the first fixing table is significantly different from the longitudinal elastic modulus of the semiconductor diaphragm. The first fixing table is highly insulating and the linear expansion coefficient thereof is approximately equal to the linear expansion coefficient of the semiconductor diaphragm. The second fixing table is made of a material having a longitudinal elastic modulus and a linear expansion coefficient approximately equal to those of the semiconductor diaphragm.

7 Claims, 6 Drawing Sheets

(110) PLANE

STATE WHERE PRESSURE IS APPLIED

SEMICONDUCTOR PRESSURE CONVERTING DEVICE

BACKGROUND OF THE INVENTION

The present invention relates to a semiconductor pressure converting device and in particular to a semiconductor converting device capable of obtaining a static pressure signal together with a pressure differential signal.

An example of a composite function type semiconductor pressure converting device capable of obtaining a pressure differential signal and a static pressure signal is disclosed in JP-A-No. 58-120142. In the device disclosed in the relevant publication, one set of semiconductor resistors sensitive to pressure differences are formed in portion of a silicon diaphragm having a smaller thickness and one set of semiconductor resistors sensitive to static pressure are formed in a portion having a greater thickness and constituting the outer periphery of the diaphragm. The silicon diaphragm is secured by adhesion to a fixing table made of glass.

Now, at a measurement of the pressure difference, since static pressure is applied uniformly to the semiconductor pressure converting device, extremely great compressive stress is produced in the set of resistors for detecting the pressure difference formed in the portion of the silicon diaphragm having a small thickness. Further, since the static pressure is applied also to the fixing table, bending stress is produced in the silicon diaphragm due to the difference in the deformation between the silicon diaphragm and the fixing table, which gives rise to errors in the setting of the zero point for the static pressure, compared with the zero point in the case of the atmospheric pressure. (In general these errors are called static pressure influence.) Since these errors are superposed on the pressure difference signal at the pressure difference measurement, the pressure difference signal includes errors. For this reason the static pressure is detected by forming a set of semiconductor resistors in the great thickness portion with the intention of correcting errors due to this static pressure.

The output level of this static pressure signal is one of several parts tens with respect to that of the pressure difference signal and therefore it is very small. The principle of the output of the static pressure signal utilizes the strain difference between the strain produced in the fixing table and that produced in the silicon diaphragm at the application of the static pressure, based on the difference in material between the fixing table and the silicon diaphragm. Consequently, in order to obtain a static pressure signal of high output level, it is necessary to have a strain difference as great as possible. However, if the strain difference is great, a great strain difference takes place also in the junction portion between the silicon diaphragm and the fixing table. Thus the strength of the junction portion comes into question and the tolerable applicable static pressure, i.e. the static pressure strength is lowered. Further, since an increase in the strain difference naturally produces great influences on the small thickness portion of the silicon diaphragm, interference between the pressure difference signal and the static pressure signal becomes large and it is difficult to obtain a pressure difference signal with a high precision, corrected with the static pressure signal of high output level.

That is, there was a problem that if the static pressure signal is increased, the static pressure strength is lowered and the interference between the static pressure signal and the pressure difference signal becomes large. This makes it difficult to obtain a corrected pressure difference signal with a high precision.

SUMMARY OF THE INVENTION

The object of this invention is to provide a semiconductor pressure converting device capable of outputting a static pressure signal of high level without lowering the static pressure strength and without increasing interferences between the static pressure signal and the pressure difference signal.

The above object can be achieved by forming a fixing table which is joined to the silicon diaphragm, of 2 structures superposed on each other and made of different substances. The first structure is made of a material having a longitudinal elastic modulus differing significantly from that of the silicon diaphragm, a high insulating property and a linear expansion coefficient approximately equal to that of the silicon diaphragm and the second structure is maintained distant from the silicon diaphragm and is made of a material having a longitudinal elastic modulus and a linear expansion coefficient approximately equal to those of the silicon diaphragm.

When the amount of deformation (at the application of the static pressure) of the first fixing structure is compared with that of the silicon diaphragm having a set of pressure difference resistors and a set of static pressure resistors, in this structure the longitudinal elastic modulus of the first structure should be smaller than that of the silicon diaphragm and thus the quantity of strain (quantity of compression) of the first structure table is greater than that of the silicon diaphragm. Therefore the first structure produces to a great strain difference at the junction interface with the silicon diaphragm. This strain difference acts as a bending stress on the upper surfaces of the great thickness portion and the small thickness portion having the set of static pressure resistors and the set of pressure difference resistors, respectively, in the silicon diaphragm. Further this strain difference influences the junction between the silicon diaphragm and the first fixing table and this bending stress influences the outputs of the set of static pressure resistors and the set of static pressure resistors. The production of this strain difference is suppressed by the second structure table and thus the strain difference is reduced. In this way the static pressure strength is increased. Further it is possible to reduce the influences of the bending stress component on a set of pressure difference signals and to decrease the interference amount between the static pressure signal and the pressure difference signal.

On the other hand, this lowering in the strain difference and the bending stress gives rise to a question of the output of the static pressure signal being lowered. However, since the distribution of the bending stress is not uniform, it is possible to raise the output level of the static pressure signal by disposing the set of static pressure resistors at the position where the greatest difference in the bending stress component can be obtained. The position of the set of static pressure resistors, where the highest output level of the static pressure signal can be obtained, is determined by the length of the great thickness portion, where the set of static pressure resistors are formed, and the thickness of the first fixing table.

DESCRIPTION OF THE PREFERRED EMBODIMENTS

Figure 1:
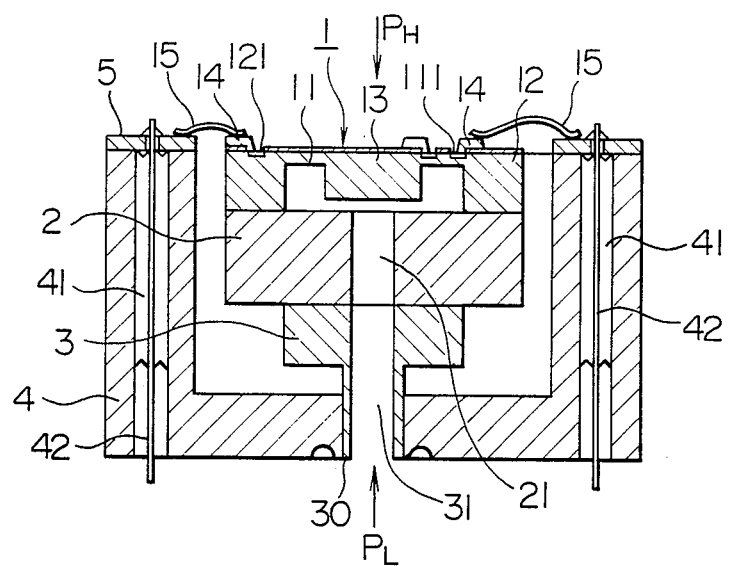
FIG 1 is a cross-sectional view of a semiconductor pressure converting device, which is an embodiment of the present invention.

Hereinbelow an embodiment of the present invention will be explained, referring to the drawings.

In FIG. 1, reference numeral 1 is a thin circular silicon diaphragm, whose plane orientation is (110). The main body of the silicon diaphragm consists of a small thickness portion 11, a central rigid portion 13 and a great thickness portion 12. In the small thickness portion 11 there are disposed a set of resistors 111 to 114 formed by diffusion. On the other hand there are disposed a similar set of resistors 121 to 124 in the great thickness portion (cf. FIG. 2). The surface of the silicon diaphragm 1, which is opposite to the surface, on which the sets of resistors are formed, is secured to a first fixing table 2 by anode bonding. This first fixing table 2 is made of Pyrex glass, etc., which has the same linear expansion coefficient as the silicon diaphragm 1 and an extremely small linear elastic modulus, and has a hole 21 for introducing a pressure $P_L$ the center. The other surface of the first fixing table 2 is secured to a second fixing table 3 by anode bonding. This second fixing table 3 is made of Fe-Ni material, etc. having the same linear expansion coefficient as the silicon diaphragm 1 similarly to the first fixing table 2, but a longitudinal elastic modulus, which is equal to that of the silicon diaphragm. A hole 31 for introducing the pressure $P_L$ is formed also at the center of the second fixing table 3, similarly to the first fixing table 2. Further the other surface 30 of the second fixing table 3 is fixed by welding the outer periphery thereof to a cylindrical body 4. The cylindrical body 4 has a thick film board 5 for electric connection with the silicon diaphragm 1 and pads on the thick film board 5 are connected with electric wiring pads 14 on the silicon diaphragm 1 through wire bonding lines 15. Further, on the cylindrical body 4, there are disposed a hermetic seal portion 41 and terminals 42 for transmitting electric signals from the silicon diaphragm 1 to the exterior and the signals from the silicon diaphragm 1 are transmitted to the exterior through these terminals 42.

Figure 2:
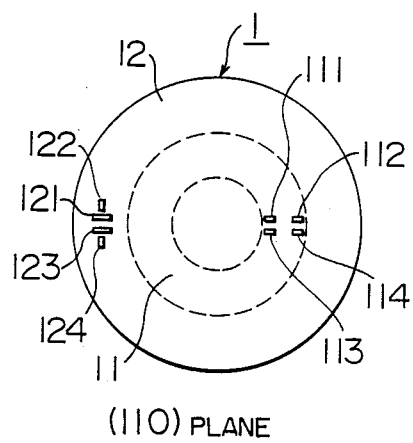
FIG. 2 is a plan view showing the arrangement of the set of resistors in the silicon diaphragm in the semiconductor pressure converting device indicated in FIG. 1.
Figure 3:
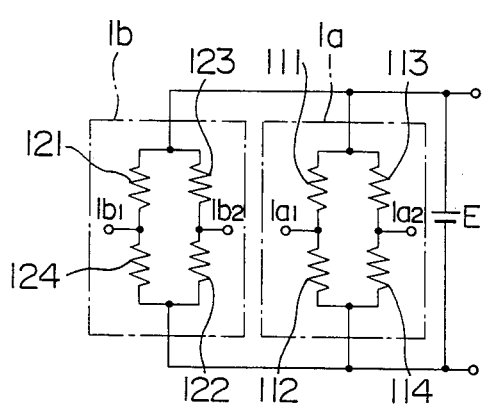
FIG. 3 is a circuit diagram for taking out the pressure signal from the set of resistors in the silicon diaphragm indicated in FIG. 2.

FIG. 2 is a plan view of the silicon diaphragm in FIG. 1. Four resistors 111 to 114 are arranged in the radial direction (whose crystallographical orientation is <111> on the small thickness portion. The resistance of this set of resistors 111 to 114 (set of pressure difference resistors) varies by the piezo resistance effect, proportionally to the difference ($P_H - P_L$) between the pressures applied to the two surfaces of the small thickness portion 11. For example, in FIG. 1, if $P_H > P_L$, since the set of resistors 112 and 114 are subjected to tensile strain, their resistance varies positively. On the contrary, since the set of pressure difference resistors 111 and 113 are subjected to compressive strain, their resistance varies negatively. The set of these resistors are connected in a bridge circuit 1a, as indicated in FIG. 3, to take out an electric signal determined by the pressure difference, which is transmitted through output terminals $1a_1$ and $1a_2$.

Even if the pressure difference is zero ($P_H = P_L$), since the set of these resistors 111 to 114 are subjected to influences of a strain produced by the difference in the longitudinal elastic modulus between the silicon diaphragm 1 and the first fixing table 2, their resistance varies. The amount of this variation is proportional to the static pressure $P_H (= P_L)$ and called generally static pressure influence. This amount of variation is superposed on the pressure difference output also at the pressure difference measurement. For this reason, in order to remove the superposed error signal to obtain a pressure difference signal with a high precision, it is necessary to effect some correction using the static pressure signal. This static pressure signal is detected by means of the set of resistors (set of static pressure resistors) 121 to 124 disposed in the great thickness portion 12 of the silicon diaphragm 1 and taken out by means of a bridge circuit 1b indicated in FIG. 3, similarly to the pressure difference signal. It is possible to obtain a precise pressure difference signal by subtracting this superposed component, using the pressure difference signal, on which this static pressure signal is superposed. That is, denoting the pressure difference signal from the silicon diaphragm, on which the static pressure is superposed, by $\Delta P'$; the precise pressure difference signal by $\Delta P$; and the static pressure signal by $P_S$, the following equation is valid;

$$\Delta P = \Delta P' - P_S$$

As described above, for obtaining a precise static pressure for correction, it is necessary to increase the output of the static pressure signal. However, since it gives influences also on the small thickness portion 11 to increase this static pressure signal, it is not desirable on characteristics and reliability. This is because the static pressure signal utilizes the bending stress in the great thickness portion 12 produced by the difference in the amount of deformation at the application of the static pressure between the first fixing table 2 and the silicon diaphragm 1 and this bending stress in the great thickness portion 12 gives influences on the bending stress in the small thickness portion 11.

In order to resolve these problems contradictory to each other, according to this invention, a second fixing table 3 is disposed so that the bending stress is transmitted to the small thickness portion 11 of the silicon diaphragm 1 as hardly as possible.

Figure 4:
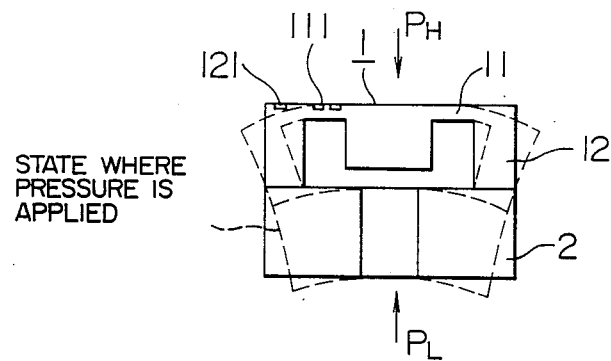
FIG. 4 is a scheme illustrating the outline of the construction of a prior art semiconductor pressure converting device.
Figure 5:
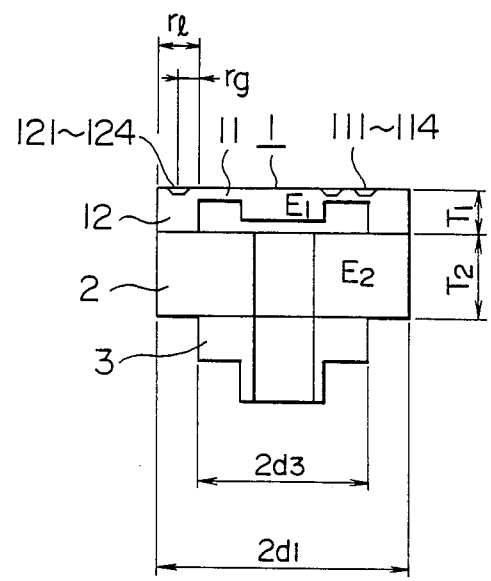
FIG. 5 is a scheme illustrating the outline of the construction of a semiconductor pressure converting device, which is an embodiment of this invention.

FIG. 4 shows the outline of the construction of a prior art semiconductor pressure converting device. The deformed state when the static pressure is applied thereto is indicated by broken lines. FIG. 5 shows the outline of the construction of a semiconductor pressure converting device according to the present invention, in which the second fixing table 3 is added.

Figure 6A:
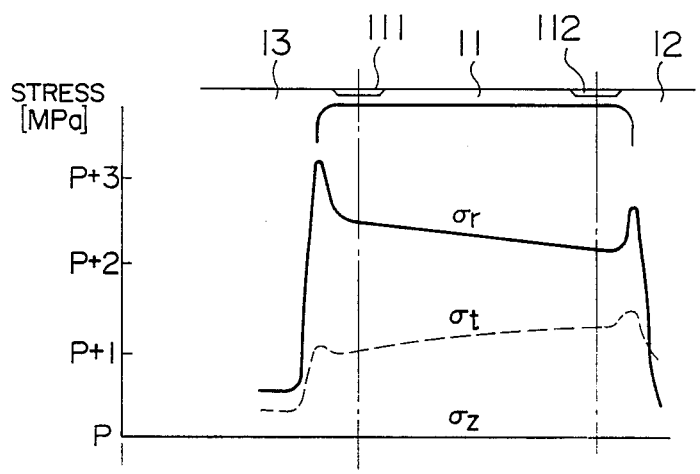
FIG. 6A shows a stress distribution induced in the small thickness portion of the silicon diaphragm in the prior art example.
Figure 6B:
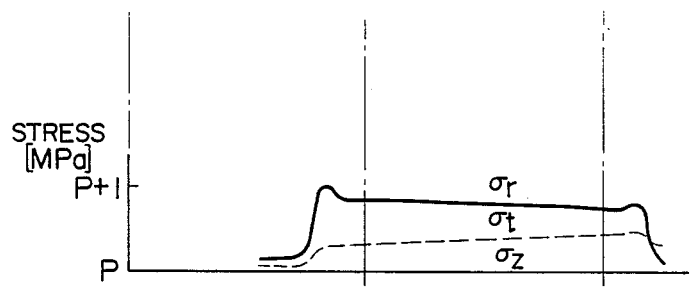
FIG. 6B shows a stress distribution induced in the small thickness portion of the silicon diaphragm in an embodiment of the present invention.

When a static pressure P is applied to semiconductor pressure converting devices having the constructions indicated in FIGS. 4 and 5, stress distributions indicated in FIGS. 6A and 6B, respectively, are produced in the small thickness portion 11 of the silicon diaphragm. In FIGS. 6A and 6B, $\sigma_r$ represents the stress in the radial direction; $\sigma_t$ the stress in the peripheral direction; and $\sigma_z$ the stress in the axial direction. In the construction of the prior art example, as indicated in FIG. 4, when the static pressure is applied, the fixing table 2 shrinks considerably due to the difference in the longitudinal elastic modulus between the silicon diaphragm 1 and the fixing table 2. The amount of this shrinkage is transmitted to the small thickness portion 11, which shows the stress distribution, as indicated in FIG. 6A. Since there is no second fixing table 3, differently from the construction according to the present invention, the strain due to the amount of shrinkage of the fixing table 2 is transmitted to the silicon diaphragm 1 and the set of the pressure difference resistors 111 to 112 are subjected to excessive stress. As the result, not only errors in the zero point setting take place, but also the linearity of the resistance variation is worsened. Further, since the lower surface of the fixing table 2 is almost free, a great interface stress (not shown in the figure) takes place between the silicon diaphragm 1 and the upper surface of the fixing table 2, which causes lowering of the tolerable applicable static pressure.

For this reason, according to the present invention, it is possible to reduce the stress generated at the interface between the small thickness portion 11 and the first fixing table 2 by suppressing the amount of shrinkage of the first fixing table 2 owing to the second fixing table 3 and at the same time to decrease the stress applied to the set of the pressure difference resistors 111 to 114, as indicated in FIG. 6B.

Figure 7:
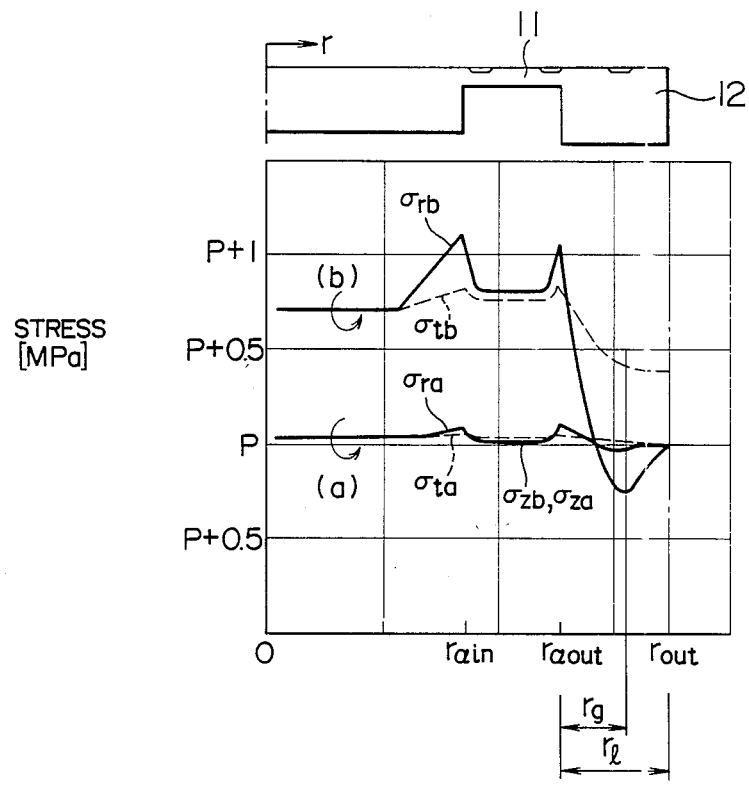
FIG. 7 shows a stress distribution induced in the silicon diaphragm in an embodiment of the present invention.

On the contrary, if the amount of this suppression is too large, the stress components in the small thickness portion 11 and the great thickness portion 12 are almost constant, as indicated by (a) in FIG. 7, and the pressure difference signal and the static pressure signal interfere with each other. However, it is not possible to obtain any static pressure signal of high output level, because no interference means on the other hand that there are no variations in the stress distribution component in the great thickness portion.

In order that a static pressure signal of high output level is obtained and that the static pressure signal and the pressure difference signal don't interfere with each other, the device may be so constructed that bending stress is generated in the great thickness portion 12 and this stress is transferred to the small thickness portion 11 as hardly as possible, as indicated in FIG. 7(b). This construction is determined by the form and the characteristics of the material of each of the silicon diaphragm 1, the first fixing table 2 and the second fixing table 3, as described later. In FIG. 7, $r_{ain}$ the inner radius of the small thickness portion; $r_{aout}$ the outer radius of the small thickness portion (inner radius of the great thickness portion); $r_{out}$ the outer radius of the great thickness portion; and $r_l$ the difference between $r_{out}$ and $r_{aout}$.

Figure 8A:
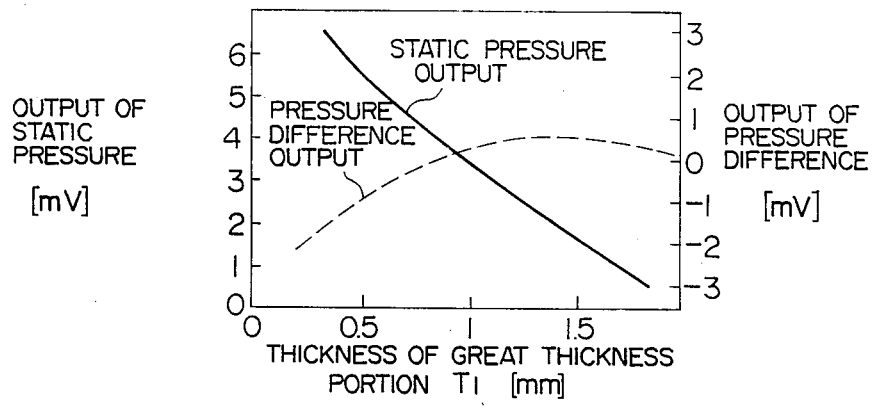
FIG. 8A shows the relation between the pressure signal and the thickness of the great thickness portion of a silicon diaphragm in a semiconductor pressure converting device, which is an embodiment of the present invention.
Figure 8B:
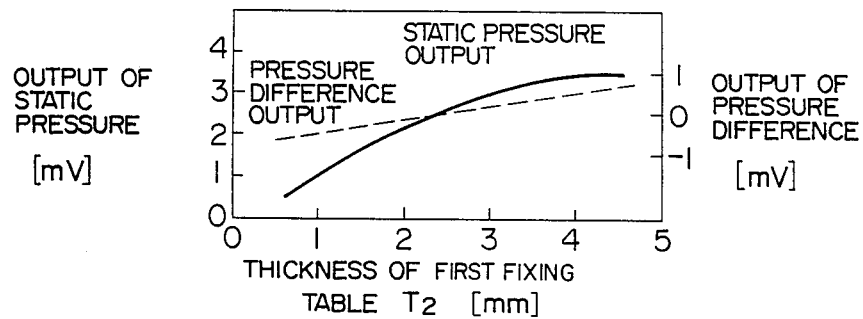
FIG. 8B shows the relation between the pressure signal and the thickness of the first fixing table in a semiconductor pressure converting device, which is the embodiment of the present invention.
Figure 8C:
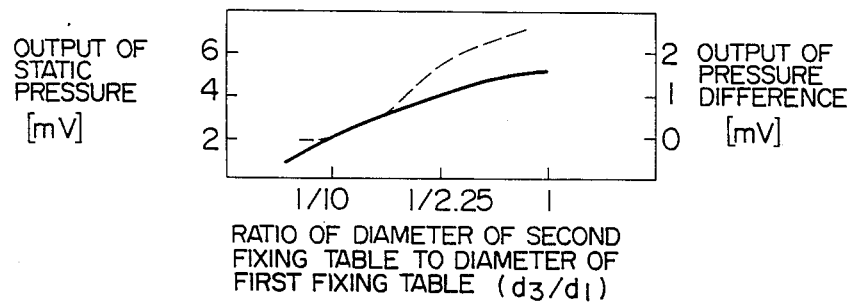
FIG. 8C shows the relation between the pressure signal and the ratio of the diameter of the second fixing table to the diameter of the first fixing table in a semiconductor pressure converting device, which is the embodiment of the present invention.

FIGS. 8A to 8c indicate 3 examples of the output from the set of pressure difference resistors and the set of static pressure resistors, in the case where various quantities (sizes) thereof are changed. For example the output of the set of the static pressure resistor increases so that a higher output level can be obtained with decreasing thickness $T_1$ of the great thickness portion of the silicon diaphragm 1 (only $T_1$ is varied and the others are fixed), but on the other hand variations in the output from the set of the pressure difference resistors also increase and the interference becomes greater, as indicated in FIG. 8A. In FIG. 8B (only $T_2$ is varied and the others are fixed) the variations are relatively smaller than those indicated in FIG. 8A stated above. Similarly, in FIG. 8C (only $d_3/d_1$ is varied and the others are fixed), it can be seen that the variations contribute considerably to the output of the set of the pressure difference resistors, similarly to FIG. 8A stated above.

From the result described above, in order to achieve the stress distribution indicated by (b) in FIG. 7, i.e. in order that a static pressure signal of high output level is obtained and that the static pressure signal and the pressure difference signal don't interfere with each other, it may be sufficient to define clearly principally the thickness $T_1$ of the silicon diaphragm 1, the thickness $T_2$ of the first fixing table 2, and the ratio $d_3/d_1$ of the outer diameter $2d_3$ of the second fixing table 3 to the outer diameter $2d_1$ of the first fixing table 2 and to determine the position $r_g$ (cf. FIG. 5) of the set of the static pressure resistors disposed on the great thickness portion 12 of the silicon diaphragm 1. That is, as indicated in FIGS. 8A to 8C, in order that a static pressure signal of high output level is obtained and that the static pressure signal and the pressure difference signal don't interfere with each other, it is necessary to reduce the thickness $T_1$ of the silicon diaphragm 1 with respect to the thickness $T_2$ of the first fixing table 2 and to transfer the amount of shrinkage of the first fixing table 2 to the great thickness portion 12 of the silicon diaphragm 1. Further it is necessary to locate the set of the static pressure resistors 121 to 124 at a position where differences in the bending stress component are great.

Hereinbelow several formulas representing these relationships are deduced. As indicated in FIG. 5, representing the longitudinal elastic modulus of the silicon diaphragm 1 by $E_1$; the thickness of the great thickness portion 12 by $T_1$; the length in the radial direction of the great thickness portion 12 by $r_1$; the position of the set of static pressure resistors (measured from the outer periphery of the small thickness portion) by $r_g$; the longitudinal elastic modulus of the first fixing table 2 by $E_2$; the thickness thereof by $T_2$; the outer diameter thereof by $2d_1$; the outer diameter of the second fixing table 3 by $2d_3$; and the applied pressure by P, a function f representing the relationship between the displacement f (vector) produced on the silicon diaphragm when the second fixing table 3 is added and these variables, can be deduced on the basis of the continuity of the first fixing table 2 and the great thickness portion 12 of the silicon diaphragm 1, when the pressure P is applied, as follows;

$$f(T_1, T_2, E_1, E_2, r_l, (d_1 - d_3)) =$$

$$\frac{P}{E_1 T_1^3} (9T_2^2 \cdot r_l^2 + 4.5 r_l^4 - 6T_2^3 \cdot r_l) -$$

$$0.6 \frac{T_2^4}{E_2 \cdot (d_1 - d_3)^3}$$

Design conditions can be deduced by setting these parameters, which make this function smallest. When these design conditions are rearranged, paying attention to the relation between $T_1$ and $T_2$, the following equation can be obtained;

$$T_1 = \alpha \cdot \sqrt[3]{\left(\frac{E_2}{E_1}\right) \cdot \frac{r_l}{T_2^2} (\beta \cdot r_l - 1)(d_1 - d_3)^3} \quad (1)$$

where $\alpha$ and $\beta$ are material constants, which are determined particularly by the Poison's ratio and the shape, of the first fixing table 2 and the silicon diaphragm 1, respectively. By using Eq. (1) it is possible to determine the shape of the various parts, from which the pressure signals can be taken out without interference of the pressure difference signal with the static pressure signal.

Further, in order to raise the output level of the static pressure signal, it is necessary to obtain the position, where the stress is maximum in the great thickness portion 12 of the silicon diaphragm 1. Representing the bending moment distribution obtained by the displacement described above by $M_x$, $$M_x = f(P, r_l, T_2, d_1)$$

is valid. Rearranging these formulas, the following equation is obtained;

$$M_x = \frac{P \cdot d_1}{2 r_l} (-3x^3 + 2 \cdot r_l \cdot x^2 + T_2^2 x) +$$

$$P \cdot d_1 \cdot T_2^2 + P \cdot \frac{r_l^2}{2} \cdot d_1$$

where x indicates the distance measured from the periphery of the great thickness portion 12. The position $r_g$ where the stress is maximum, can be given by;

$$r_g = \frac{1}{3} r_l + \sqrt{\xi r_l^2 + \eta T_2^2} \quad (2)$$

where $\xi$ and $\eta$ are constants determined by the shape.

It can be seen from Eq. (2) that the position $r_g$ of the set of static pressure resistors can be determined almost by the length $r_l$ of the great thickness portion of the silicon diaphragm 1 and the thickness $T_2$ of the first fixing table 2. At this position the difference of bending stresses is greatest.

Next an example of the size of the various parts, obtained by using Eqs. (1) and (2) is shown, as a concrete embodiment.

|  | Name of material | E | v |
|---|---|---|---|
| Silicon diaphragm: | Si | 17000 kgf/mm$^2$ | 0.3 |
| First fixing table 2: | Pyrex glass | 7000 kgf/mm$^2$ | 0.25 |
| Second fixing table 3: | Fe—Ni | 16000 kgf/mm$^2$ | 0.3 |
| (1) for | $T_2 = 4.0$ mm, $d_1 = 7.0$ mm, $d_3 = 3.5$ mm, $r_l = 2.0$ mm $T_1 = 0.82$ mm ($\alpha = 0.5$, $\beta = 1.5$) $r_g = 1.4$ mm ($\xi = 0.10$, $\eta = 0.01$) | | |
| (2) | $T_2 = 3.0$ mm, $d_1 = 7.0$ mm, $d_3 = 5.0$ mm, $r_l = 2.0$ mm $T_1 = 0.57$ mm ($\alpha = 0.5$, $\beta = 1.5$) $r_g = 1.3$ mm ($\xi = 0.10$, $\eta = 0.01$) | | |

The curve indicated by (b) in FIG. 7 shows a stress distribution on the surface of the silicon diaphragm 1, in which there are disposed the set of static pressure resistors and the set of pressure difference resistors, obtained by the method described above using numerical analysis, in the case where the composite function type pressure difference sensor is constructed. In this way, it was possible to confirm that the output of the set of static pressure resistors is obtained without impairing the stress distribution in the small thickness portion (so that the stress distribution is not as indicated in FIG. 6A) and without giving any influences on the output of the set of static pressure resistors.

Figure 9:
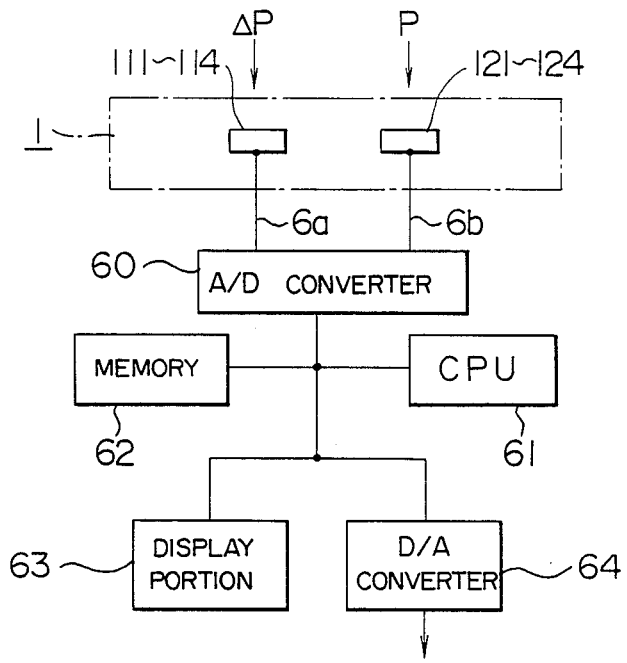
FIG. 9 shows an embodiment of the processing flow chart for the detection signal from the semiconductor pressure converting device according to the present invention.
Figure 10:
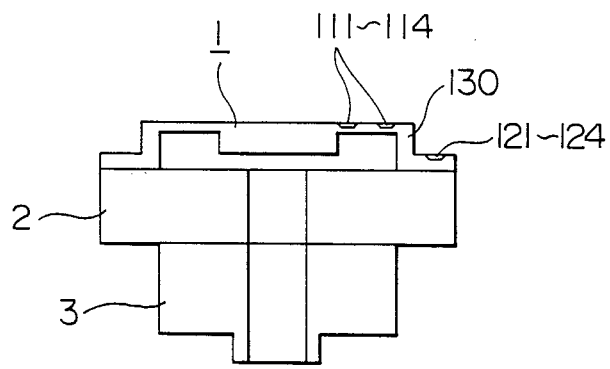
FIG. 10 is a scheme illustrating the outline of the construction of a semiconductor pressure converting device, which is another embodiment of the present invention.

FIG. 9 is a scheme showing an embodiment of the processing flow for the detection signal from the semiconductor pressure converting device according to this invention. When pressures P+ΔP and P are applied to the front and the rear surface of the silicon diaphragm 1, the resistances of the set of pressure difference resistors formed in the small thickness portion vary and an electric signal proportional to the pressure difference ΔP is generated between the terminals $1a_1$ and $1a_2$ in FIG. 3. This electric signal is inputted in an A-D converter 60 through a terminal 42 in a hermetic seal portion 41 and a lead 6a. At the same time the static pressure P is detected by the set of static pressure resistors 121 to 124 formed in the great thickness portion 12 of the silicon diaphragm 1, which generates a static pressure signal between the terminals $1b_1$ and $1b_2$ in FIG. 3. This electric signal is inputted in an A-D converter 60, similarly to the pressure difference signal. The A-D converter digitizes this signal and gives it to a CPU 61, which executes predetermined operations. The CPU 61 transmits a pressure difference signal proportional precisely only to the pressure difference ΔP, from which influences of the static pressure are removed. Further it sends also a static pressure signal to the exterior. Reference numeral 62 represents a memory, in which data necessary for the operations executed in the CPU 61 and operation programs are stored. The pressure difference signal or the static pressure is displayed in a display device 63 and sent to others after having converted it into an analogue signal in a D-A converter 64.

According to the embodiment described above of the present invention:

(1) it is possible to obtain a static pressure signal of high output level;

(2) it is possible to obtain a pressure difference signal with a high precision, for which errors due to the static pressure are completely corrected, by raising the output level of the static pressure; and (3) it is possible to take out alone a signal proportional to the static pressure P and to take out the static pressure signal up to a high pressure region.

Although in the present embodiment the set of static pressure resistors and a set of pressure difference resistors are formed in a (110) plane and in a <111> direction of the silicon diaphragm, the crystallographical axis and the crystallographical plane can be chosen arbitrarily. For example, the set of static pressure resistors can be arranged in a <110> direction, when a substrate of a (100) plane is used.

Further, although in the present embodiment the small thickness portion of the silicon diaphragm is shown as a center-rigid-shaped body as an example, the same effect can be Obtained even with a uniform small thickness portion having no center-rigid-body.

Still further, although in the present embodiment a diaphragm made of silicon is used, it may be made of other semiconductor such as gallium arsenide, etc.

Furthermore, the effect remains unchanged, even if a silicon diaphragm is used, in which a non-interference beam portion 130 is disposed between the great thickness portion, where the set of static pressure resistors 121 to 124 are formed, and the small thickness portion, where the set of pressure difference resistors 111 to 114 are formed. In this case, compared with the embodiment described above, since the non-interference beam portion 130 can separate completely the interference position of the set of static pressure resistors and that of the set of pressure difference resistors, it is possible to obtain the static pressure signal of higher output level without interferences of the pressure difference signal therewith.

As explained above in detail, by means of the semiconductor pressure converting device according to the present invention, since it is possible to take out the static pressure signal of high output level without interference with the pressure difference signal, a remarkable effect can be obtained that a pressure difference measurement and a static pressure measurement can be carried out simultaneously with a high precision and that efficiency is improved and labor is saved in a process measurement.

We claim:

1. A semiconductor pressure converting device comprising:

a semiconductor diaphragm including a small thickness portion and a great thickness portion disposed at the periphery thereof;

a set of pressure difference detecting resistors formed in a surface of said small thickness portion;

a set of static pressure detecting resistors formed in a surface of said great thickness portion;

a first fixing table joined with the surface of said great thickness portion which is opposite to the surface on which said static pressure detecting resistors are formed, the first fixing table having a longitudinal elastic modulus being significantly different from the longitudinal elastic modulus of said semiconductor diaphragm, said first fixing table being highly insulating and having a linear expansion coefficient approximately equal to the linear expansion coefficient of said semiconductor diaphragm; and a second fixing table joined with a surface of said first fixing table which is opposite to the surface to which said great thickness portion is joined, a longitudinal elastic modulus and a linear expansion coefficient of said second fixing table being approximately equal to those of said semiconductor diaphragm.

2. A semiconductor pressure converting device according to claim 1, wherein said semiconductor diaphragm is made of silicon.

3. A semiconductor pressure converting device according to claim 1, wherein said first fixing table and said second fixing table are cylindrical and coaxial with each other.

4. A semiconductor pressure converting device according to claim 3, wherein the thickness in the axial direction of said great thickness portion is determined by the thickness in the axial direction of said first fixing table, a ratio of the longitudinal elastic modulus of said first fixing table to the longitudinal elastic modulus of said semiconductor diaphragm, a ratio of the outer diameter of said second fixing table to the outer diameter of said first fixing table and the thickness in the radial direction of said great thickness portion.

5. A semiconductor pressure converting device according to claim 3, wherein said set of static pressure detecting resistors are located at a position where the difference between bending stress in the radial direction and bending stress in the peripheral direction in said great thickness portion is greatest, when static pressure is applied thereto.

6. A semiconductor pressure converting device according to claim 3, wherein the position, at which said set of static pressure detecting resistors are located, measured in the radial direction from the inner peripheral surface of said great thickness portion, is determined by the thickness in the axial direction of said first fixing table and the thickness in the radial direction of said great thickness portion.

7. A semiconductor pressure converting device according to claim 1, wherein the longitudinal elastic modulus of said first fixing table is smaller than the longitudinal elastic modulus of said semiconductor diaphragm.

* * * * *